US006925526B2

(12) United States Patent
Hall

(10) Patent No.: US 6,925,526 B2
(45) Date of Patent: Aug. 2, 2005

(54) METHOD AND APPARATUS FOR SERVICING MIXED BLOCK SIZE DATA ACCESS OPERATIONS IN A DISK DRIVE DATA STORAGE DEVICE

(75) Inventor: David Robison Hall, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 421 days.

(21) Appl. No.: 10/285,650

(22) Filed: Oct. 31, 2002

(65) Prior Publication Data

US 2004/0088479 A1 May 6, 2004

(51) Int. Cl.[7] .............................................. G06F 12/00
(52) U.S. Cl. ........................... 711/113; 711/112; 360/48
(58) Field of Search ................................ 711/112, 113, 711/114; 360/48

(56) References Cited

U.S. PATENT DOCUMENTS

| | | | | |
|---|---|---|---|---|
| 5,341,361 A | * | 8/1994 | Hosaka .................... 369/275.3 |
| 5,517,632 A | * | 5/1996 | Matsumoto et al. ........ 711/114 |
| 5,813,025 A | * | 9/1998 | Murphy et al. ............. 711/114 |
| 6,145,052 A | * | 11/2000 | Howe et al. ................ 711/112 |
| 6,278,566 B1 | * | 8/2001 | Blumenau .................... 360/48 |
| 6,378,037 B1 | | 4/2002 | Hall ........................... 711/113 |

FOREIGN PATENT DOCUMENTS

WO     WO 9422134 A2 *    9/1994          G11B/5/012

OTHER PUBLICATIONS

Provisional U.S. Appl. No. 60/333,963, filed Nov. 27, 2001, Zhang et al.*
Hans–Peter Messmer, The Indispensable PC Hardware Book, 2nd ed., Addison–Wesley Publishing Co. Inc., 1995, pp 732–733 and 744–746.*

* cited by examiner

*Primary Examiner*—Mano Padmanabhan
*Assistant Examiner*—John M. Ross
(74) *Attorney, Agent, or Firm*—Roy W. Truelson

(57) ABSTRACT

Write operations less than full block size (short block writes) are internally accumulated while being written to disk in a temporary cache location. Once written to the cache location, the disk drive signals the host that the write operation has completed. Accumulation of short block writes in the drive is transparent to the host and does not present an exposure of data loss. The accumulation of a significant number of short block write operations in the queue make it possible to perform read/modify/write operations with a greater efficiency. In operation, the drive preferably cycles between operation in the cache location and the larger data block area to achieve efficient use of the cache and efficient selection of data access operations. In one embodiment, a portion of the disk surface is formatted at a smaller block size for use by legacy software.

15 Claims, 8 Drawing Sheets

METHOD AND APPARATUS FOR SERVICING MIXED BLOCK SIZE DATA ACCESS OPERATIONS IN A DISK DRIVE DATA STORAGE DEVICE

FIELD OF THE INVENTION

The present invention relates to rotating disk data storage devices, and in particular, to the management of enqueued data access operations of mixed and small block sizes.

BACKGROUND OF THE INVENTION

The latter half of the twentieth century has been witness to a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

The extensive data storage needs of modern computer systems require large capacity mass data storage devices. While various data storage technologies are available, the rotating magnetic rigid disk drive has become by far the most ubiquitous. Such a disk drive data storage device is an extremely complex piece of machinery, containing precision mechanical parts, ultra-smooth disk surfaces, high-density magnetically encoded data, and sophisticated electronics for encoding/decoding data, and controlling drive operation. Each disk drive is therefore a miniature world unto itself, containing multiple systems and subsystem, each one of which is needed for proper drive operation. Despite this complexity, rotating magnetic disk drives have a proven record of capacity, performance and cost which make them the storage device of choice for a large variety of applications.

A disk drive typically contains data recorded in multiple sectors located on concentric tracks on the surface of one or more flat disks, which rotate at a constant speed. In order to access data (read data from the disk or write data to the disk), a moveable actuator positions a transducer adjacent a desired data track. The drive then waits until the disk rotates to an angular position in which the desired data sector is directly adjacent the transducer. The time required for the disk drive to execute any given data access operation therefore includes the time required to move the actuator from its current position to the desired track position (referred to as a seek) and the time required to wait until the disk rotates to the desired angular position (referred to as latency). The execution time also includes the time required to actually read or write the data once the actuator is properly positioned, but experience has shown that for many operating environments, the amount of data accessed in each operation is relatively small, and that the seek and latency times are more significant than the time required to read or write the data.

Data is formatted in blocks on the disk surface, and read write operations to the disk surface are always in some multiple of blocks. One of the fundamental design issues for any disk drive is the block size of data transfer, in other words, the minimum amount of data that can be accessed in a data access operation. A smaller block size tends to reduce the amount of unnecessary data transfer, i.e., the number of unneeded bytes that must be read or written simply because they are in the same block as the needed data. On the other hand, larger block sizes generally increase the formatting efficiency, since a certain amount of disk surface must be devoted to block identification, block boundaries, and so forth. Larger block sizes also tend to reduce the soft error rate. Thus, a design trade-off exists, and an optimal block size is chosen which is a compromise of these competing factors.

In order to keep up with advances in other areas of digital data processing technology, disk drive storage devices must make continual improvements in performance, reliability and data capacity. As both the computer industry and the design of disk drives have evolved, the choice of optimal block size has shifted to favor larger blocks. Several developments have influenced this shift. There has been an increase in the average size of data access operations due to many changes in the way software is written and the uses to which it is put. For example, software objects tend to be larger, database records tend to be larger, and disk storage is often used for holding massive graphics or multimedia files. Furthermore, the increased rotational speed of disks and the higher areal bit density have meant that a small number of unneeded bytes which are accessed near the end of a block become less significant in terms of performance impact, especially since seek and latency take up most of the time of a data access operation.

For a number of years, a 512-byte block size was considered a standard in the disk drive industry. As a result, a great deal of computer software has been written on the assumption of a 512-byte standard block size. In more recent years, it has become increasingly obvious to disk drive designers that block sizes should be increased. A size that is often mentioned as an alternative is 4 Kbytes (4096 bytes), although other sizes are possible. Some newer software is being written to a larger I/O size, such as 4K.

Although the desirability of larger blocks is evident, the transition from a 512-byte block size to a 4-Kbyte block size places disk drive designers in a quandary. At the host interface, it is possible to support any size data transfer. But if data is stored on the disk surface in the older 512-byte blocks, nothing is gained (i.e., formatting efficiency and soft error rate are the same as for older designs). On the other hand, if data is stored in 4-Kbyte blocks, there is a performance penalty associated with writing blocks of the older 512-byte size. I.e, if the host issues a write command for a block or set of adjacent blocks smaller than 4 Kbytes, the drive can not directly write a portion of the 4 Kbyte block, since other data in the same block will be lost. It must first read the entire 4-Kbyte block before it can perform the write, replace the old data within the block with the new data, and then write the entire updated block back to the disk (referred to as a read/modify/write).

A large volume of such small write operations may significantly affect the performance of a disk drive having an internal block size greater than the size of the write operations. A need exists for improved techniques for handling small write operations while at the same time obtaining the benefits of larger formatted block sizes.

SUMMARY OF THE INVENTION

In accordance with one aspect of the present invention, write operation of a block size less than the full block size (herein referred to as short block write operations) are accumulated in an internal queue within the disk drive while the data represented by these operations is written to disk in a temporary alternate location. Once the data has been written to an alternate location, it has effectively been stored in non-volatile storage, and the disk drive signals the host that the write operation has completed. Thus, accumulation of short block write operations in the queue is transparent to the host and does not present an exposure of data loss. The accumulation of a significant number of short block write operations in the queue make it possible to perform read/modify/write operations with a greater efficiency.

In a preferred embodiment, a small portion of the disk surface is formatted at 512 byte block sizes for use in caching short block writes. This area might be as small as a single cylinder located at the OD, or might be multiple cylinders or tracks, which may be located at a single location (e.g., the OD) or dispersed on the disk surface. In operation, the drive cycles between operation in the 512-byte block band and the larger block area. Specifically, when an internal queue of data access drops below a threshold, the drive switches to writing short block writes in the 512-byte band at the OD, and continues writing 512-byte blocks to sequential locations in the 512-byte band until all pending short block writes have been cached or some other limit is reached.

The effect of this mode of operation is that the internal queue of data access operations (including reads and writes associated with short block write operations which have already been cached in the 512-byte block band) is artificially maintained at a high level. The increased size of this internal queue facilitates greater efficiency in data access operations and overcomes much of the performance deficit related to short block write operations in a disk formatted for larger block sizes.

In another aspect of the invention, a portion of the disk surface is formatted at a smaller block size (e.g. 512 bytes) for use by legacy software using the older block size. The portion of the disk surface allocated to 512 byte blocks can be dynamically variable, so that it may gradually shrink as system software is migrated to the larger (4K) block size and the number of small write operations decreases. The dedication of even a relatively small portion of disk surface to smaller block sizes can make a significant performance improvement in the drive.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Overview of Disk Drive Design

Figure 1:
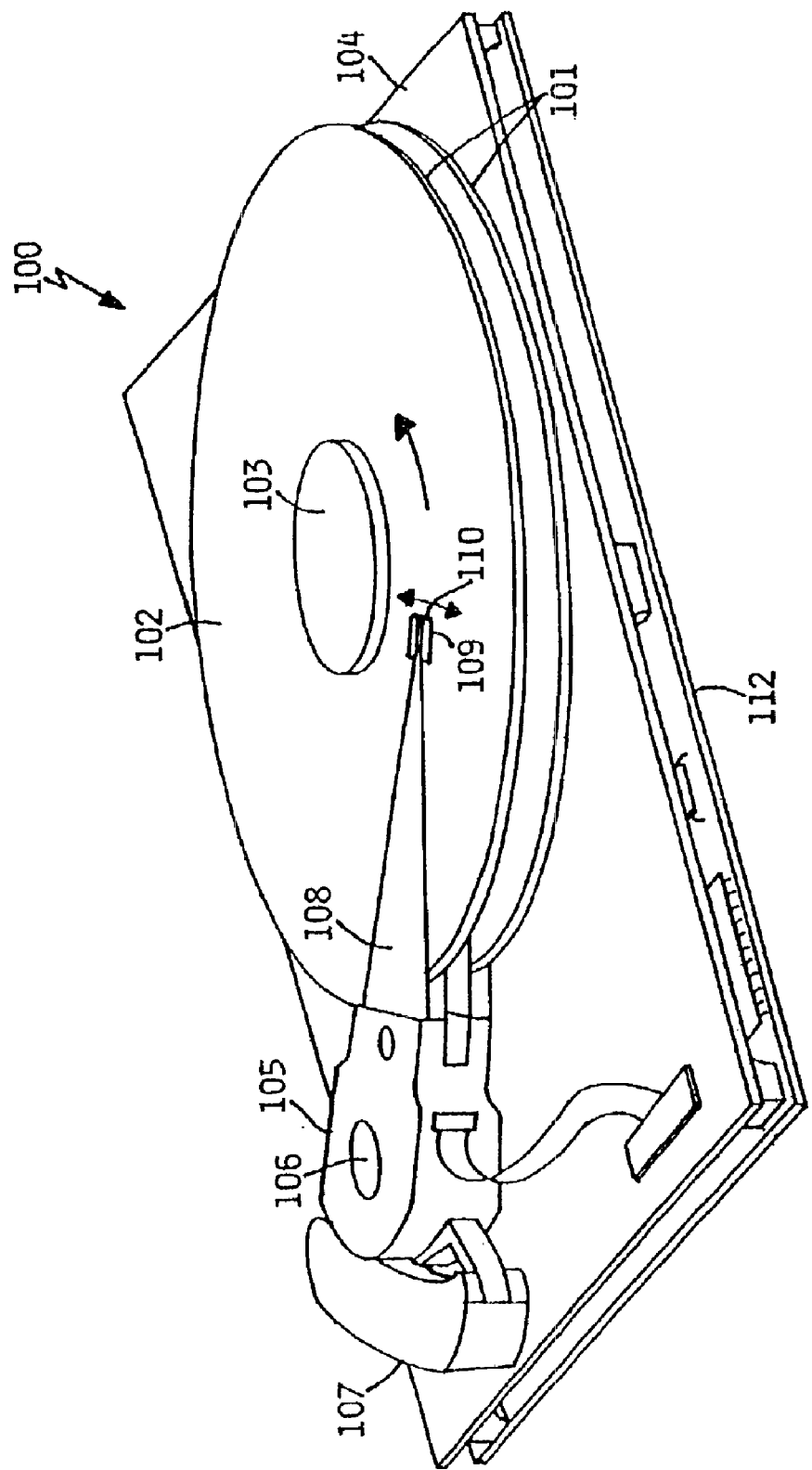
FIG. 1 is a simplified representation of a rotating magnetic disk drive storage device, for use in accordance with the preferred embodiment of the present invention.

A rotating rigid magnetic disk drive typically contains one or more smooth, flat disks which are permanently attached to a common spindle or hub. Where more than one disk is used, the disks are stacked on the spindle parallel to each other and spaced apart so that they do not touch. The disks and spindle are rotated in unison at a constant speed by a spindle motor.

The spindle motor is typically a brushless DC motor having a multi-phase electromagnetic stator and a permanent magnet rotor. The different phases of the stator are sequentially driven with a drive current to rotate the rotor.

Each disk is formed of a solid disk-shaped base or substrate, having a hole in the center for the spindle. The substrate is commonly aluminum, although glass, ceramic, plastic or other materials are possible. The substrate is coated with a thin layer of magnetizable material, and may additionally be coated with a protective layer.

Data is recorded on the surfaces of the disk or disks in the magnetizable layer. To do this, minute magnetized patterns representing the data are formed in the magnetizable layer. The data patterns are usually arranged in circular concentric tracks, although spiral tracks are also possible. Each track is further divided into a number of sectors. Each sector thus forms an arc, all the sectors of a track completing a circle. Within the sectors are blocks of data, representing the smallest unit of data transfer (read or write).

A moveable actuator positions a transducer head adjacent the data on the surface to read or write data. The actuator may be likened to the tone arm of a phonograph player, and the head to the playing needle. There is one transducer head for each disk surface containing data. The actuator usually pivots about an axis parallel to the axis of rotation of the disk(s), to position the head. The actuator typically includes a solid block surrounding the axis having comb-like arms extending toward the disk (which is, for this reason, sometimes referred to as the "comb"); a set of thin suspensions attached to the arms, and an electromagnetic motor on the opposite side of the axis. The transducer heads are attached to the end of the suspensions opposite the comb, one head for each suspension. The actuator motor is typically an electromagnetic coil mounted on the actuator comb and a set of permanent magnets mounted in a stationary position on the base or cover; when energized, the coil imparts a torque to the comb in response to the magnetic field created by the permanent magnets. The actuator motor rotates the actuator to position the head over a desired data track (a seek operation). Once the head is positioned over the track, the constant rotation of the disk will eventually bring the desired sector and block adjacent the head, and the entire block of data is then read or written. The time spent waiting after completion of the seek until the desired sector is adjacent the head is known as latency, and thus the time required to commencement of a data access operation is the sum of seek and latency times. The time required to read (or write) a block of data, once the actuator has been positioned as described, is relatively small in comparison to seek and latency times.

Typically, a servo feedback system is used to position the actuator. Servo fields identifying the data tracks are written on at least one disk surface, usually at the time of manufacture. Older disk drive designs often employed a dedicated disk surface for servo fields. Newer designs typically use embedded servo sectors, i.e., servo sectors are recorded at angularly spaced portions of each disk surface, the area between servo sectors being used for recording data. The embedded servo field typically comprises a synchronization portion, a track identifying portion for identifying a track number, and a track centering portion for locating the centerline of the track. When operating in a seek mode, the servo system causes the transducer to read the track identifying portion to determine the current track number, and adjusts the actuator trajectory accordingly. When operating in a track following mode, the servo system causes the transducer to read both track identifying portion and track centering portion, to determine a deviation from the desired track centerline, and the servo feedback system adjusts the position of the actuator to minimize the deviation.

The transducer head is an aerodynamically shaped block of material (usually ceramic) on which is mounted a magnetic read/write transducer. The block, or slider, flies above the surface of the disk at an extremely small distance (referred to as the "flyheight") as the disk rotates. The close proximity to the disk surface is critical in enabling the transducer to read from or write the data patterns in the magnetizable layer. Several different transducer designs are used. Many current disk drive designs employ a thin-film inductive write transducer element and a separate magneto-resistive read transducer element. The suspensions actually apply a force to the transducer heads in a direction into the disk surface. The aerodynamic characteristics of the slider counter this force, and enable the slider to fly above the disk surface at the appropriate distance for data access.

Description of Major Components

Referring to the Drawing, wherein like numbers denote like parts throughout the several views, FIG. 1 is a simplified drawing of a rotating magnetic disk drive storage device 100, for use in accordance with the preferred embodiment. Disk drive 100 comprises rotatable disks 101, which are rigidly attached to hub assembly or spindle 103, which is mounted on disk drive base or housing 104. Spindle 103 and disks 101 are driven by a drive motor at a constant rotational velocity in the counter-clockwise direction, when viewed from above as shown in FIG. 1. The drive motor (not visible in FIG. 1) is contained within hub assembly 103. Data is recorded on the top and bottom surfaces 102 of each disk. Actuator assembly 105 is situated to one side of disks 101. Actuator 105 rotates through an arc about shaft 106 parallel to the axis of the spindle, driven by electromagnetic motor 107, to position the transducer heads. A cover (not shown) mates with base 104 to enclose and protect the disk and actuator assemblies. Electronic modules for controlling the operation of the drive and communicating with another device, such as a host computer, are mounted on circuit card 112. In this embodiment, circuit card 112 is shown mounted outside the enclosure formed by base 104 and the cover. However, the card 112 could also be mounted inside the head/disk enclosure, or a portion of the electronics may be mounted inside the enclosure, while another portion is mounted outside the enclosure. A plurality of head/suspension assemblies 108 are rigidly attached to the prongs of actuator 105. An aerodynamic slider 109 with a read/write transducer 110 is located at the end of each head/suspension assembly 108 adjacent disk surface 102.

While disk drive 100 is shown with two disks having multiple disk surfaces for recording, it should be understood that the present invention could utilize a drive having a single disk, or having a larger number of disks, and that it would be possible to employ only a single disk surface of a disk for recording data.

Figure 2:
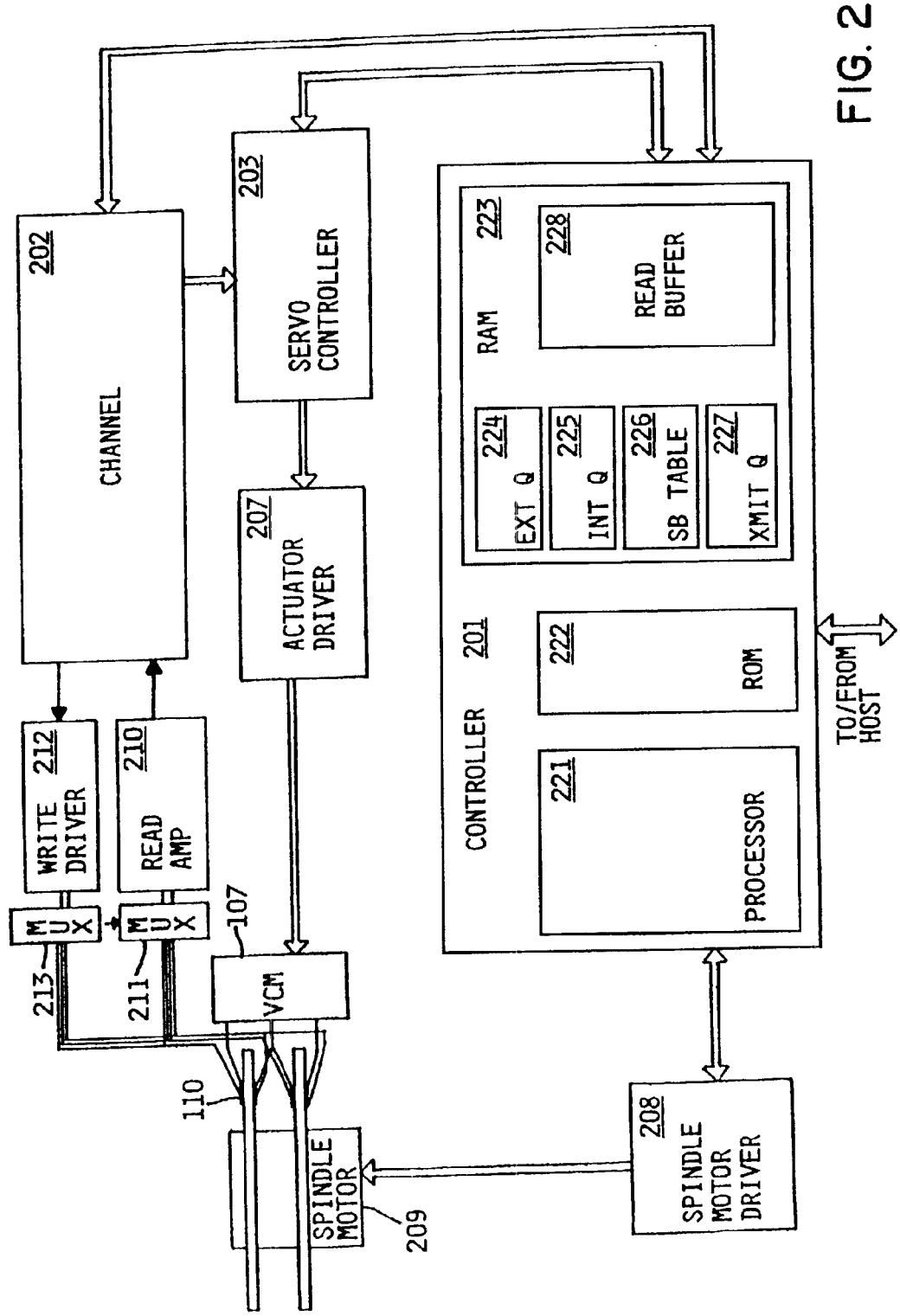
FIG. 2 is a high level diagram of the major electronic elements of a disk drive storage device, according to the preferred embodiment.

FIG. 2 is a high-level diagram of the major electronic elements of disk drive 100, showing how these are connected to one another and to the transducer heads, actuator motor and spindle motor, according to the preferred embodiment. File controller 201 provides a data interface to a host. The "host" is usually a computer system such as a desktop computer system or a mainframe computer system, although it may be a special purpose device such as a personal digital assistant (PDA), a digital controller for machinery such as an automobile or robot, or any of various other digital devices. Controller 201 also provides general control of the operation of disk drive 100, including such functions as command interpretation, sector mapping, power-up routines, diagnostics, error recovery, etc. In particular, file controller 201 manages internal and external queues of data access operations for caching small write operations in special disk tracks, as described in greater detail herein. Channel electronics 202 provides modulation and demodulation function for data being written to and read from the disk surface. A servo controller 203 interprets servo signals obtained from reading servo fields on the disk to control the actuator motor (VCM 107); it also responds to seek signals from file controller 201. Spindle motor drive circuitry 208 provides drive current to spindle motor 209, driving the motor at a desired rotational velocity.

Transducers 110 are attached via lead wires to write multiplexer 213 and to read multiplexer 211, which are in turn coupled to write driver 212 and read amplifier 210, respectively. Read amp 210 provides input to channel electronics 202. Channel electronics provides input to write drive 212. Multiplexers 211 and 213 select one of the heads for writing or reading, responsive to control signals from file controller 201. Magnetic patterns representing data or servo signals are sensed by magneto-resistive read elements in transducers 110, amplified by read amp 210, and provided to channel electronics 202. Channel electronics preferably includes a partial-response maximum likelihood (PRML) filter for decoding data signals into coherent data for use by a host system. When writing data, channel electronics 202 encodes data according to a pre-determined encoding format, and provides this data to write driver 212, which in turn drives current through an inductive write element to cause the data to be written on the disk surface.

Positioning of transducers 110 is achieved by a servo feedback loop system comprising transducers 110, read amp 210, channel electronics 202, servo controller 203, actuator driver 207, and actuator motor 107. Transducers 110 read servo fields recorded at periodic intervals on disk surfaces 102; these are amplified by read amp 210; channel electronics 202 separate the servo fields from user data; servo controller decodes servo signals received from channel 202 to identify the track and position error, determine actuator drive current need to follow or seek according to desired parameters, and provides actuator motor drive circuitry 207 with a signal indicating the necessary drive current. Actuator motor drive circuitry 207 in turn provides drive current to actuator voice coil motor (VCM) 107, positioning actuator 105 to a desired location (follow mode) or accelerating/decelerating the actuator in accordance with a desired profile (seek mode).

File controller 201 preferably includes programmable processor 221 which executes a control program resident in read-only memory (ROM) 222. ROM 222 is a non-volatile semiconductor random access memory, the contents of which are not lost when disk drive 100 is powered down. File controller also includes volatile read/write memory (RAM) 223. RAM 223 is the general working storage used by controller 201. RAM 223 preferably contains a single addressable memory space, which may be allocated by controller 201 to various uses. RAM 223 is used as a temporary cache for data being read from and written to one or more of the disk surfaces, and for storing internal state variables necessary for drive operation. In particular, RAM 223 includes external command queue 224, internal data access operations queue 225, short block write status table 226, transmit queue 227, and read buffer 228. RAM 223 may include other data structures and storage allocations (not shown).

Although certain disk drive features are shown and described above, in particular separate magneto-resistive read and inductive write transducers elements, it should be understood that these are by way of describing the preferred embodiment only, and it would be possible to practice the present invention using different transducer elements or other alternative disk drive design features, now known or hereafter developed. It should further be understood that various electronic components such as file controller 201, channel 202, servo controller 203, etc. are shown in FIG. 2 as discrete entities for illustrative purposes, and that one or more of these may be combined as a single module, or may be embodied in multiple modules. In particular, elements of the controller 201 may in fact be implemented as a single module, or may be implemented as multiple modules. RAM 223 may be a single or multiple modules, and may use multiple storage technologies; e.g., a portion of RAM 223 may be static RAM, while another portion is dynamic RAM. It should further be understood that the preferred allocation of ROM and RAM is dependent in part of the cost of currently available technology, and that as memory technologies develop it may be preferable to use a single monolithic memory such as non-volatile RAM, or some other combination of memory technologies. It should further be understood that various disk drive components not essential to an understanding of the present invention have been omitted from FIGS. 1 and 2 for clarity of illustration.

Memory Description

RAM 223 includes external command queue 224 of pending data access operation commands received from a host. External queue 224 stores data access commands that have been received by disk drive 100 from a host, but which have not yet been executed from the perspective of the host. This last qualifier is significant. In the case of a read command, the command is executed from the host's perspective when drive 100 returns the data requested in the read command, which typically occurs shortly after the data is read from the disk surface. However, in the case of a write command, the command is executed from the host's perspective when drive 100 signals that the data has been written, even if it in fact has not. As explained herein, in the case of at least some write commands, the drive will write the data to a special area of the disk and then signal the host that the data has been written, causing the command to fall off the external command queue.

RAM 223 further includes a separate internal queue 225 of pending data access operations, i.e., physical accesses to disk, to be performed by disk drive 100, which is to be distinguished from external queue 224. Operations on internal queue 225 are not necessarily ordered directly by an external host, and in some cases, are completely unknown to the host. In the case of a read command, a corresponding read operation is normally placed on internal queue 225 when received from the host (if not already in the read buffer) and is removed from internal queue 225 when the data is read from the disk into the read buffer. In the case of a write command, the procedure is more complex. Certain short block writes will cause write to a special disk area, followed by a read of the full data block, followed by another write, requiring multiple operations to be placed on the internal queue. This procedure is explained in greater detail herein.

RAM 223 further includes short block write status table 226, which records the status of short block write operations so that the controller is able to determine which operations have yet to be completed. Normally, a short block write is first written to the reserved short block area at the disk OD, then a read of the full data block is performed, followed by a write to the full data block. However, is some cases, as explained more fully herein, certain of these steps are by-passed. By recording the status of steps completed for each short block write, table 226 enables the controller to determine the next step required.

RAM 223 further includes transmit queue 227 which holds responses for transmission to the host; in general, data is on the transmit queue a relatively short length of time in comparison to the time on external queue 224 and internal queue 225. RAM 223 further includes a read buffer 228 of data read from the disk surfaces and intended for transmission to a host or for modification with write data in a short block write operation, as explained herein. Transmit queue 227 and read buffer 228 may have any conventional structure, but in the case of a read operation, the transmit queue will typically point to the read data in the read buffer. Once a response is transmitted, the response will be removed from the transmit queue. However, data may remain in the read buffer some time after it is transmitted to the host, and will sometimes be read again.

The queues, tables and buffers described above may be organized according to any of various known formats for organizing similar data. In addition to the tables and structures specifically mentioned, RAM 223 further contains the dynamic working memory variables and data structures used by controller processor 221 to direct various aspects of control program execution not essential to an understanding of the present invention.

Disk Surface Allocation

Figure 3:
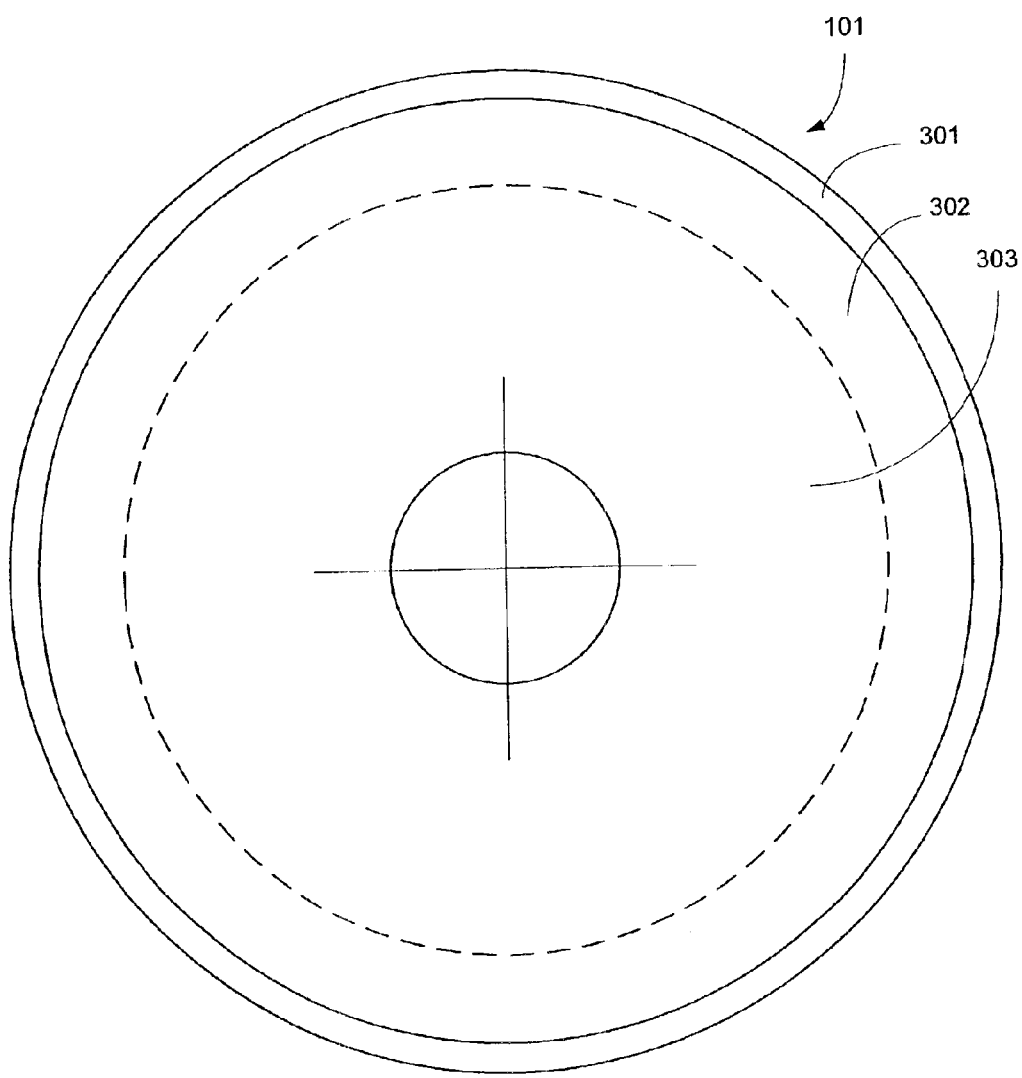
FIG. 3 illustrates the arrangement of differently formatted areas of a disk surface, according to certain embodiments of the present invention.

FIG. 3 illustrates the arrangement of differently formatted areas on the surface of a disk 101 of disk drive 100, according to the preferred and certain variations thereof of the present invention. In the preferred embodiment, a relatively narrow band of disk surface 301 (short block cache band) is permanently set aside for use in caching short write blocks. This area is preferably at the outer diameter of disk 101, although it may be located elsewhere. This area is formatted to a block size of the short blocks, i.e. approximately 512 bytes, although a small number of additional bytes may be added to the block size for purposes of recording a location at which the corresponding data is to be written in a full block and other information needed in the event of recovery from a volatile memory data loss before the data can be written to the full block. The actual size of short block cache band 301 is exaggerated in FIG. 3 for purposes of illustration. In fact, it is expected that such a band be very small, and may be as small as a single track.

A relatively large band 303 (large block band) comprising the bulk of the surface area of the disk is formatted to a larger block size, which in the preferred embodiment is 4K. Data is stored in this band in a persistent manner, i.e., it is not a cache which is overwritten as is band 301, but data once written remains at the location until some host process decides to either update it or remove it. In one variation of the preferred embodiment, an intermediate band 302 (small block band) between bands 303 and 301 is formatted to the short block size (512 bytes) and is used for persistent storage of legacy data. The boundary between small block band 302 and large block band 303 is shown as a dashed line, to indicate that the size of small block band 302 is variable, and in one variation of the preferred embodiment, no small block band 302 exists at all, the entire areas shown by bands 303 and 302 being formatted as a single large block band.

Preferably, the formatting shown in FIG. 3 is repeated on all disk surfaces, so that a short block cache band 301 of one or more tracks exists on each disk surface. However, it would alternatively be possible to place the short block cache band, or the small block band 302, on only a single disk surface, or on fewer than all surfaces. As an additional alternative, the disk area reserved as a cache area for short block writes may instead be multiple tracks or bands which are dispersed at multiple radial locations on the disk surface. As a further alternative, it is known that in some disk drive designs, there are small variations in formatted track density due to variations in the transducer heads and other factors, which result in variations in the total number of tracks on different disk surfaces. In such a case, it would be possible to select disk surfaces having a larger number of tracks for allocating some of the tracks as short block cache areas, thus equalizing the total number of data tracks on the different disk surfaces.

Operation

In operation, a control program in ROM 222 executing on processor 221 causes the controller handle the operation of internal queue 225, by scheduling, among other things, appropriate short block (cached) write operations followed by reads to the full block and writes to the full block at which the data is stored. The control program additionally selects operations for execution from the internal queue in such a manner as to alternate between writing operations to short block cache band 301 and the persistent data bands (303 and, if it exists, 302), generally writing multiple operations to the short block cache band 301 in each cycle.

Figure 4A:
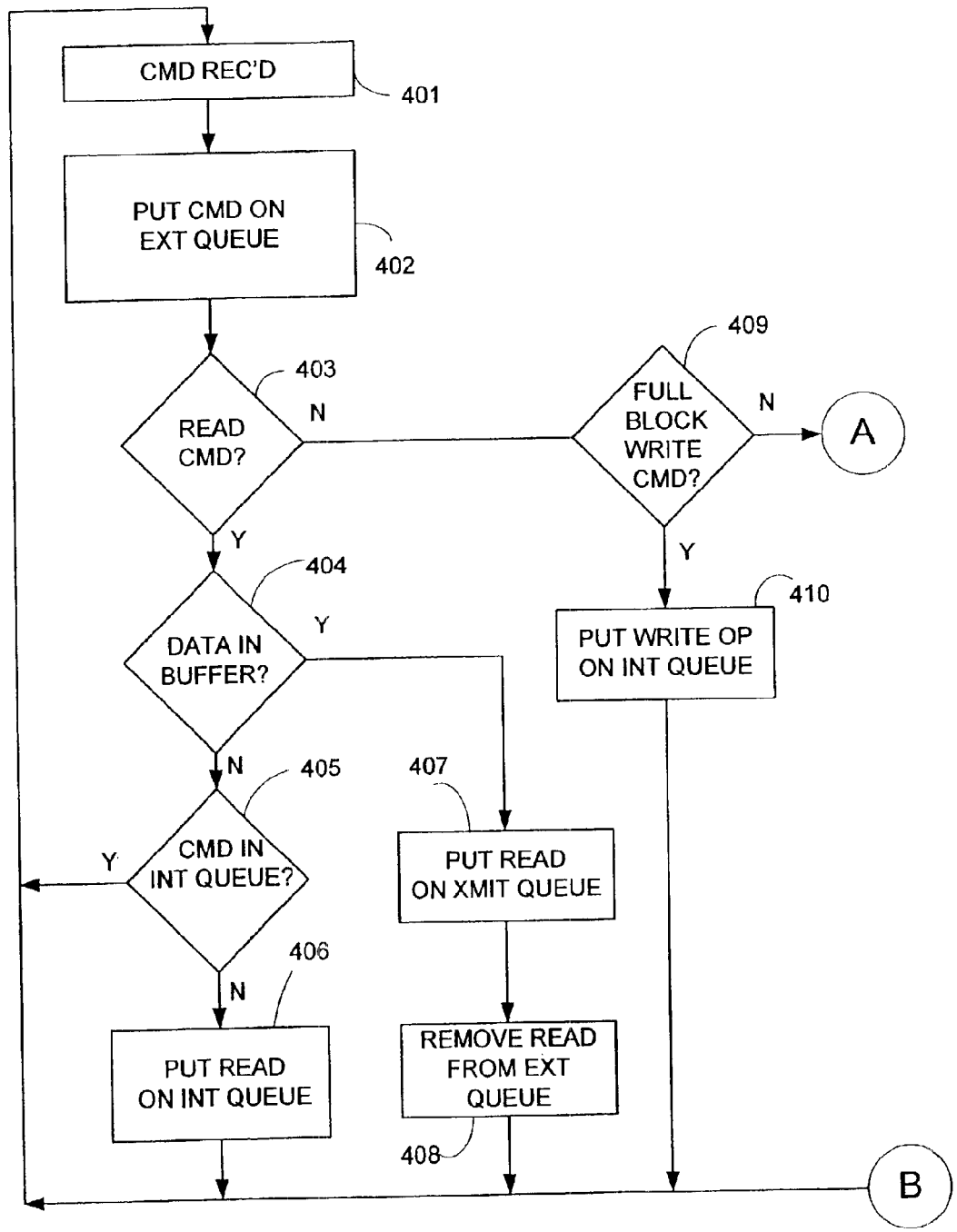
FIGS. 4A and 4B (herein collectively referred to as FIG. 4) show a flow diagram illustrating the process of receiving an external command at the disk drive, according to the preferred embodiment.
Figure 4B:
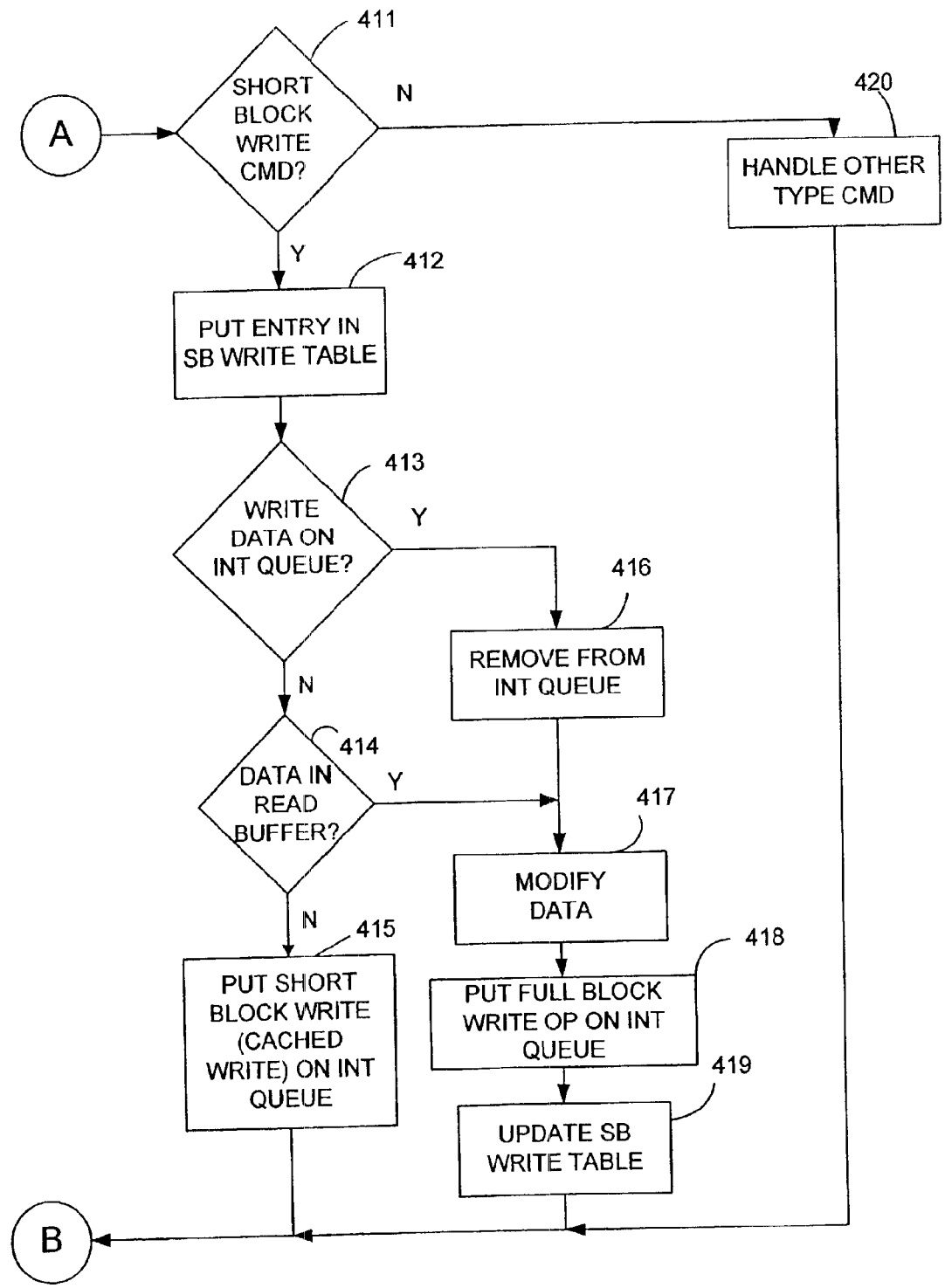

FIG. 4 shows a flow diagram illustrating the process of receiving and initially processing an external command (i.e., a command from the host) at disk drive 100, according to the preferred embodiment. As shown in FIG. 4, upon receipt of a command (step 401), the command is placed on external queue 224 (step 402). The command might be a read command, a full block write command, a short block write command, or some other type of command.

If the command is a read command (the "Y" branch from step 403), then the controller determines whether the requested data is already in read buffer 228 (step 404). The requested data may already be in the read buffer because it was recently read in response to another read command received from the host, or because it was read in response to a short block write. If the data is not in the read buffer ("N" branch from step 404), the controller determines whether there is already a read command to the same data block on internal queue 225 (step 405). This could be the case for either of the reasons that dat might be in the read buffer. If a read operation is already on the internal queue (the "Y" branch from step 405), the controller returns to wait from the next command. If no read operation for the same block is already on the internal queue, a read operation is placed on the internal queue (step 406), and the controller returns to wait for the next command.

If, at step 404, it was determined that the read data already exists in the read buffer, it is possible to simply respond to the host with the data in the buffer. In this case, the read response is put on transmit queue 227 for transmission to the requesting host (step 407), and the read command is removed from external queue 224. The controller then returns to wait for the next command.

If the command is a full block write command (the "Y" branch from step 409), then a corresponding write operation is simply placed on internal queue 225 (step 410), and the controller returns to wait for the next command. A full block write command is a write command where the block length of the write data in the command is the same as the block length of the formatted data on the disk surface to which the data should be written. Therefore, not only is a 4K block write to large block area 303 considered a "full block write", but a 512 byte write to small block area 302 is also considered a "full block write".

If the command is a short block write command (the "Y" branch from step 411), the controller generates and initializes an entry for the command in short block write status table 412 (step 412), the initial status of the entry reflecting that the command has been received from the host, but no internal data access operations have yet been performed. The controller then determines whether there is a write operation currently on internal queue 225 to the data block (i.e, in disk band 303) at which the short block is contained (step 413). This might occur, e.g., because another write command, particularly another short block write command, to the same data block was recently received. If there is no such write operation on the internal queue, the "N" branch is taken from step 413. The controller then determines whether the data block in which the short block is contained is currently in the read buffer (step 414). This might occur for the same reason noted above, or because the block was recently read in response to a read command. If the data is not in the buffer, the "N" branch from step 414 is taken. In this case, a short block write operation (i.e., a cached write operation) to write the short block data to short block cache band 301 is put on the internal queue (step 415).

If, at step 413, the controller finds another enqueued write operation to the same block, the "Y" branch is taken. The write operation is removed from the internal queue (step 416). The data to be written is then modified with the short block write data (step 417), the full block write operation is put back on the internal write queue (step 418), and the short block write status table is updated to reflect that the data is awaiting write to data band 303 (step 419).

If, at step 414, the controller finds the data block in the read buffer, the "Y" branch is taken from step 414. In this case, steps 417–419 are performed as above, but it is not necessary to first remove anything from the internal queue.

If, at step 411, the command is some other type of command (i.e., neither a read nor a full block write nor a short block write), the "N" branch is taken, and the other type of command is handled as appropriate (step 420).

Figure 5:
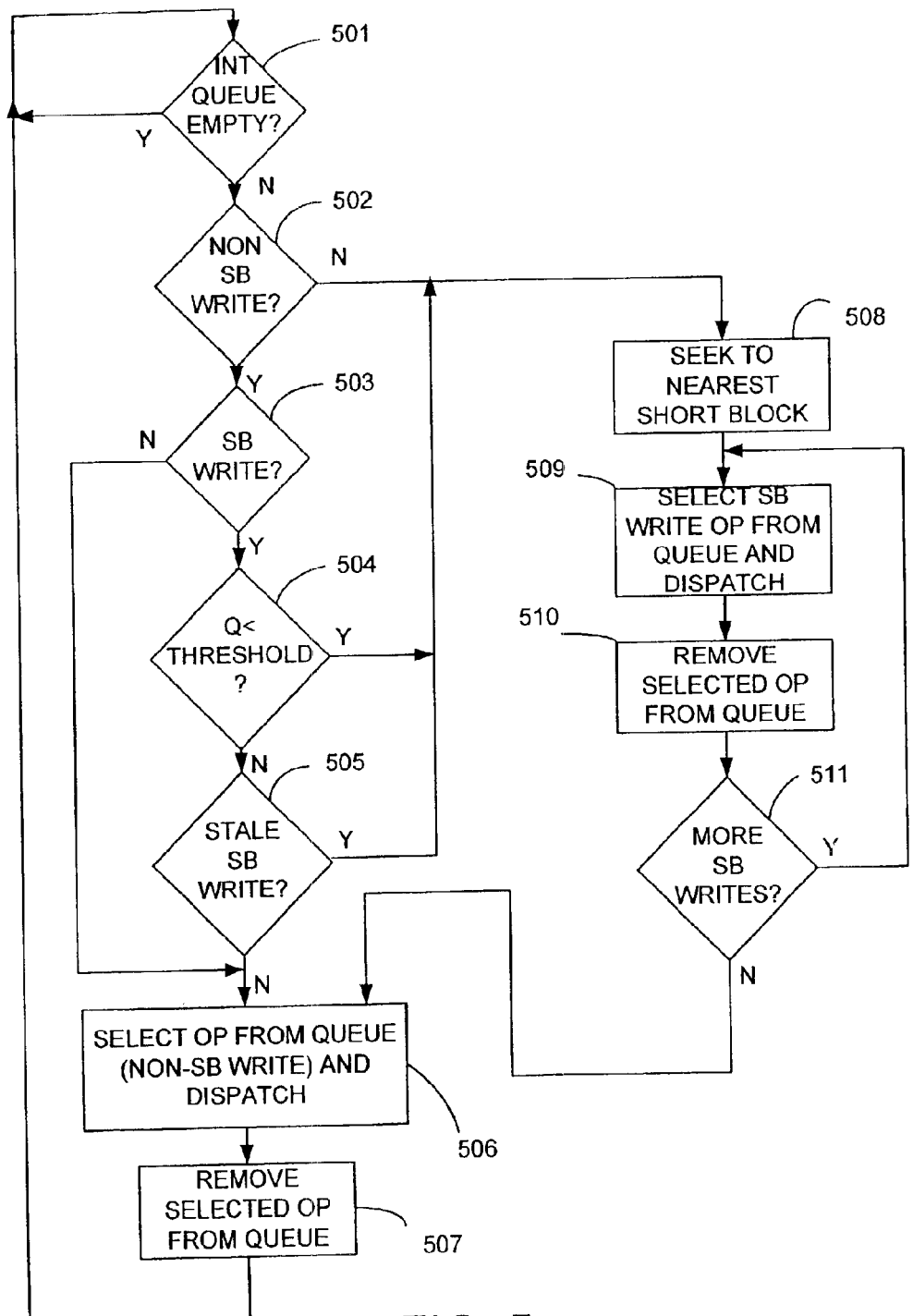
FIG. 5 is a flow diagram illustrating the process of dispatching data access operations from the internal queue, according to the preferred embodiment.

Data access operations placed on the internal queue await execution and are removed from the queue when selected for execution. Selection of operations from the internal queue for execution does not occur in strict order of placing the operation on the queue. A selection process which enables the disk drive to alter the order of execution of enqueued operations in order to achieve greater operating efficiency is a significant aspect of the present invention. FIG. 5 is a flow diagram illustrating the process of dispatching data access operations from the internal queue, according to the preferred embodiment.

Referring to FIG. 5, if the internal queue is non-empty, the "N" branch is taken from step 501 to select an operation for dispatch from the queue and execution by the various components of the disk drive. The controller first determines whether it should dispatch for execution a short block (cached) write operation, i.e., a write operation to cache band 301 (i.e., perform the steps 508–511), or it should instead execute a different data access operation, such as a read or full block write (i.e., perform steps 506–507). The process of choosing between these two options is shown as steps 502–505.

The controller determines whether there is at least one operation on the queue which is not a short block write (step 502). If only short block writes are on the queue, the "N" branch is taken from step 502. In this case, it is unnecessary to perform any other determinations, and a short block write will be selected. If, on the other hand, there is at least one operation which is not a short block write, the "Y" branch is taken from step 502. The controller determines whether there is at least one short block write operation on the queue (step 503). If not, it is not necessary to look further, and the "N" branch is taken from step 503, causing an operation other than a short block write to be selected. If there is at least one short block write and at least one operation which is not a short block write, the "Y" branch is tach from step 503.

The controller then determines whether the number of operations (other than short bock writes) on the internal queue is less than some pre-determined threshold (step 504). The threshold used in step 504 may be a threshold which is fixed at all times, or may be a variable threshold which varies depending on current operating conditions, specifically, varies depending upon how busy the disk drive is, the threshold generally being higher when drive is busier. If the number of such operations on the queue is less than the threshold, the "Y" branch is taken from step 504, and a short block write is selected for execution. Otherwise, the "N" branch is taken, and the controller determines whether there are stale short block write operations on the queue (step 505). Any measure of staleness might be used, and the measure might be variable depending on how busy the drive is or other factors, but in general, if there is a short block write operation which has been waiting on the queue an excessively long time, the "Y" branch will be taken from step 505 so that the short block write operation is chosen next. Step 505 is performed to avoid starving the short block write operations indefinitely where the drive is very busy, i.e., it is possible that the internal queue will remain above the threshold for a very long time so that short block write operations are never selected and simply accumulate on the queue.

If the "N" branch is ultimately taken from step 505 (or the "N" branch is taken from step 503), the controller selects an operation which is not a short block write operation from internal queue 225 for execution (step 506), and removes the selected operation from the internal queue (step 507). I.e., it considers the various operations on the queue, other than the short block write operations, and selects one of these operations for execution based on any of various selection criteria designed to provide enhanced performance of the drive. Typically, this means that operations projected to have a lower seek time and/or latency from the current actuator position with respect to the disk surface are preferred for execution, although the formula used may include other factors. Any of various algorithms, now known or hereafter developed, may be used for this purpose. Examples of such algorithms are disclosed in commonly assigned copending U.S. patent applications: Ser. No. 10/215,403 issued as U.S. Pat. No. 6,859,859, filed Aug. 8, 2002, by Hall, entitled "Method and System for Efficiently Calculating and Storing Expected Access Time Information for DASD"; Ser. No. 09/638,253 issued as U.S. Pat. No. 6,725,327, filed Aug. 14, 2000, by Espeseth et al., entitled "Space-Efficient Expected Access Time Algorithm for Hard Disk Drive Command Queue Ordering"; and Ser. No. 10/285,256, filed Oct. 31, 2002 by Hall, entitled "Method and Apparatus for Selecting Enqueued Data Access Operations for Execution in a Disk Drive Data Storage Device" all of which are herein incorporated by reference.

If a short block write is selected for execution (i.e., the "N" branch from step 502, or the "Y" branch from step 504 or the "Y" branch from step 505), the controller orders the actuator to seek to the nearest available block in short block cache band 301 (step 508). Depending on how band 301 is organized, there may be one or several blocks available for use. In general, writes to band 301 are sequential, starting at the location immediately after where the last block was written. It is possible to organize band 301 as a single sequence of blocks which wraps to the beginning when all blocks are written (and thus having only one block available as a starting point at any given time), or as several independent sequences having several respective starting points. The former alternative is simpler from a management standpoint, but the latter alternative may reduce latency when first seeking to the short block band in step 508.

The controller selects a short block write operation from the queue for execution (step 509). Because any pending short block write operation in the queue can be written to the available block on the disk, all blocks will execute in the same amount of time, and there is no need for a sophisticated algorithm in choosing a block. Preferably, the oldest block on the queue is written first. The selected operation is then removed from the queue (step 510).

If any more short block writes remain on the queue (step 511), the controller returns to step 509 to choose another short block write for execution. The effect of step 511 is that, once the drive decides to execute a short block write and seeks to short block cache band 301, the controller will completely empty the queue of any short block writes, without considering the availability of other operations in the queue. When all the short blocks are written, the controller continues to step 506 to select another type of operation from the internal queue, as previously described. It would alternatively be possible to use some other test at step 511, such as the number of operations (other than short block writes) on internal queue 225, or some combination of factors.

It will be observed that the effect of the flow control described above and illustrated in FIG. 5 is to cycle between operation in the short block write cache band 301 and the large block (or small block) data band(s) 303 (and 302), and that while operating in one band, the drive normally executes multiple operations, before switching to the other band. The reasons for this behavior are several. Short block writes are written sequentially in band 301. Therefore, when operating in band 301, there is essentially no seek time and no latency for these operations (neglecting occasions in which a track fills up and the actuator must perform a head switch or seek to another track). This makes it possible to empty the queue of all the short block writes very quickly, once the actuator has been moved to the short block cache band 301 and writing has started. Since these short block writes can be performed very efficiently, it is reasonable to continue choosing short block writes until there are no more in the queue. At the same time, while operating in the large band 303, it is unwise to make individual seeks to the short cache band even if such as seek can be performed more quickly than another operation in the queue, because it is best to accumulate the short block writes and write a batch at a time.

It has been observed that algorithms which select operations from a queue for execution (e.g. step 506) perform best when there are a sufficient number of operations on the queue for selection. This makes sense, for if too few operations are on the queue, the controller may be constrained to select operations which can not be performed very efficiently, i.e., without significant seek or latency times. Therefore, the writing of the short blocks is triggered at step 504 when the queue falls below a certain threshold. This threshold is related to the minimum size of queue needed for efficient operation. If the number of operations in the queue is above the threshold, then step 506 can be performed in such a manner as to provide a reasonably efficient selection in most instances. If not, efficiency of selection at step 506 drops, and it is therefore wise to empty the queue of any short writes. Because the algorithm at step 506 does not consider short block writes, for purposes of step 504, the short write operations are not counted in meeting the threshold. As explained below, the execution of short block writes has the effect of adding other operations (reads and full block writes) to the internal queue, therefore artificially increasing the size of the internal queue when it is too small for efficient operation.

After completion of an internal disk access operation (i.e., the operation selected from the internal queue is actually executed by seeking to the desired track and reading or writing the data), the controller handles completion of the operation. This process is illustrated in FIG. 6.

Figure 6A:
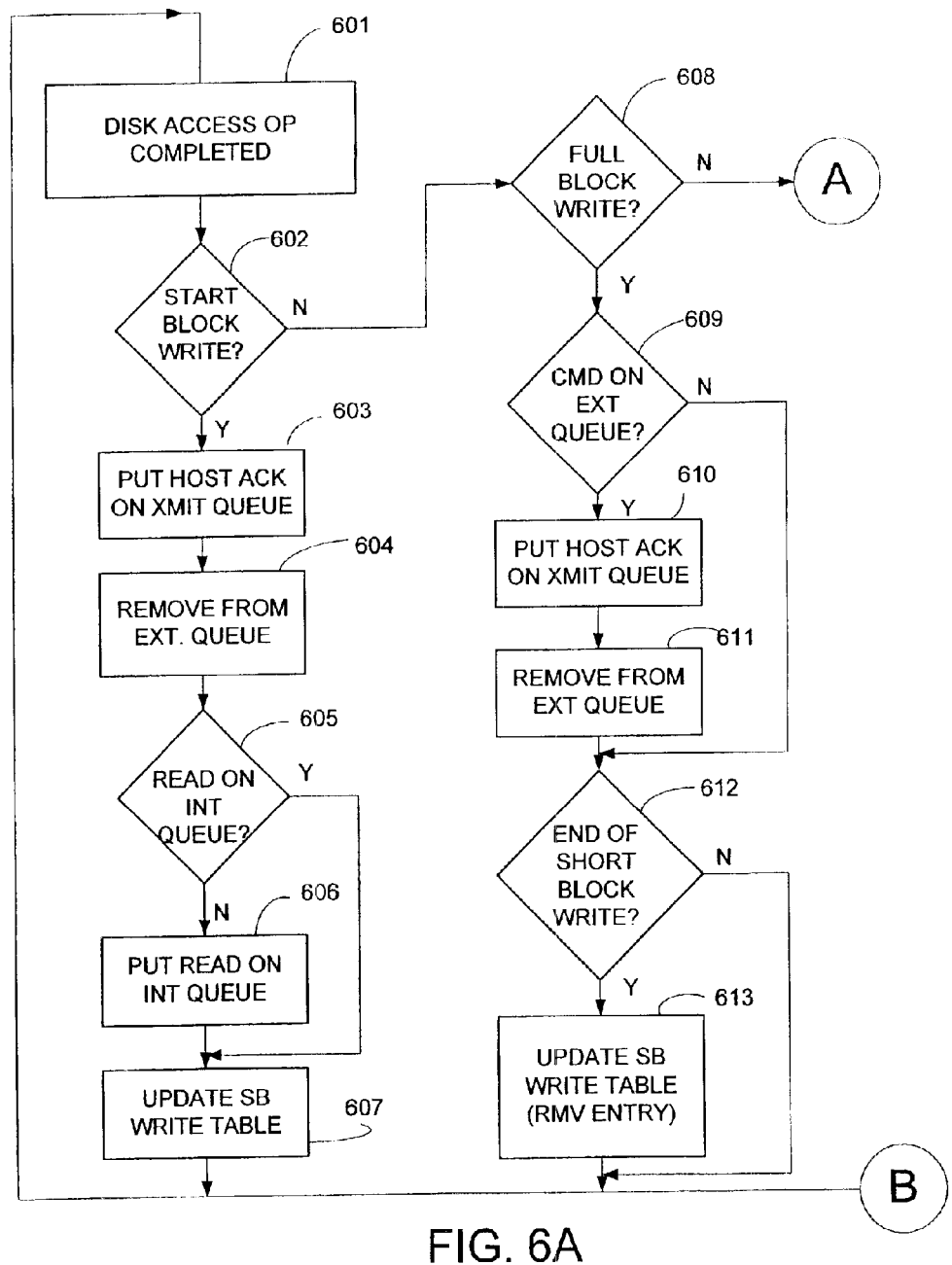
FIGS. 6A and 6B (herein collectively referred to as FIG. 6) show a flow diagram illustrating the process of handling the completion of an internally executed disk access operation in the disk drive, according to the preferred embodiment.
Figure 6B:
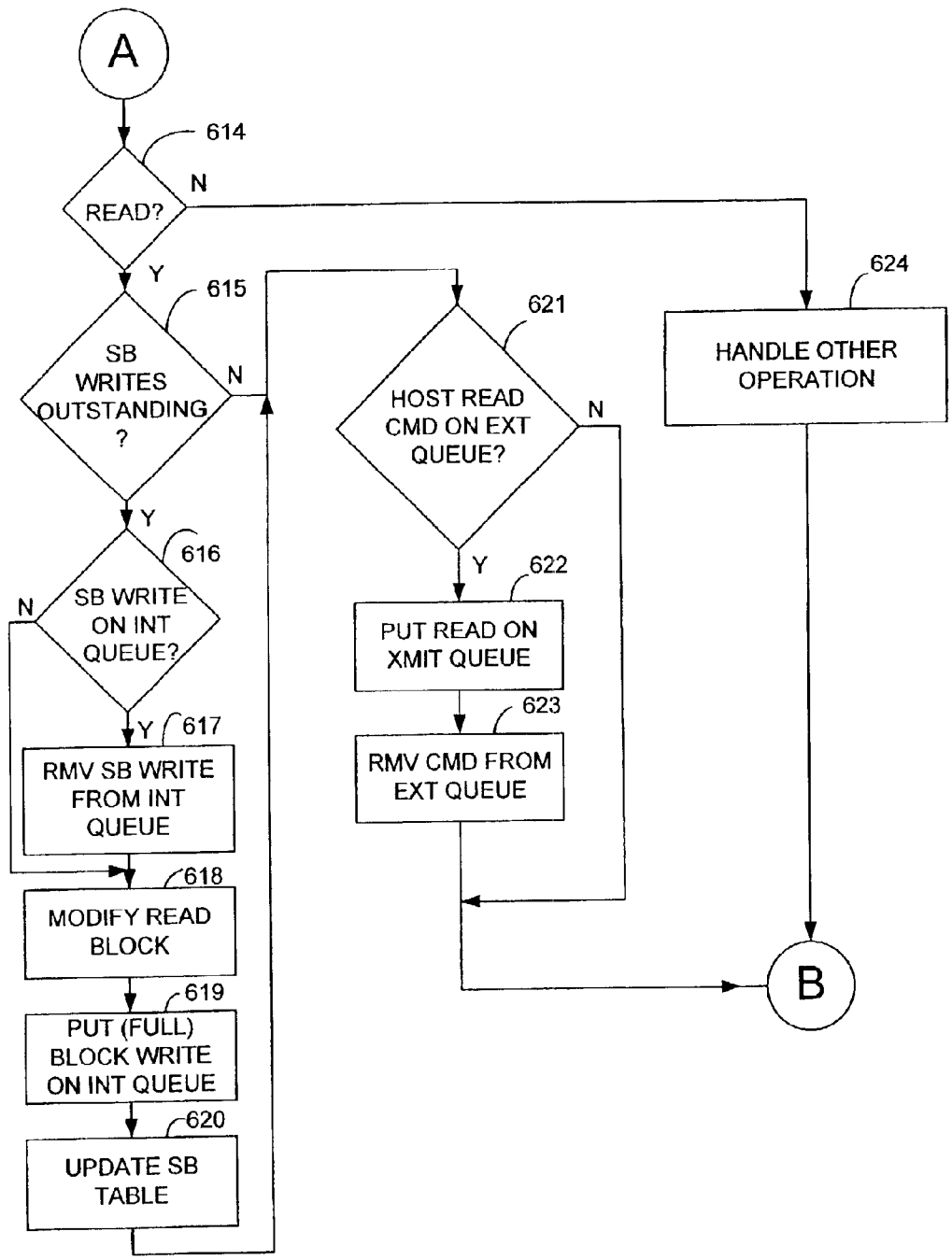

The process of FIG. 6 is triggered when a disk access operation completes, shown as step 601. This operation could have been a short block write (i.e., a write to short block cache band 301), a full block write (i.e., a write of a full block to either data band 302 or 303), a read operation, or some other type of operation (such as diagnostics, power on or power off, etc.).

If the operation was a short block write to cache band 301 (the "Y" branch from step 602), the controller generates a host acknowledgment for placement on the transmit queue to the host, to inform the host that the write operation has been completed (step 603). The corresponding short block write command is then removed from the external queue (step 604). It will be observed that the data has not yet been written to its final destination in a full size block area of band 303, but from the host's perspective, the write is complete once the host receives an acknowledgment of the write.

The controller then determines whether there already exists a read operation on the internal queue for the full data block in which the short block is contained (step 605). Such a read might exist, e.g., because the drive recently received another short block write command for a short block within the same large block. If no such read operation is on the internal queue, a read operation is placed on the internal queue (step 606). In either case, the controller then updates short block write status table 226 to reflect that the short block write has now been committed to cache band 301 and is awaiting a read of the full data block (step 607). The controller then returns and awaits completion of the next operation at step 601.

If the operation was a full block write (the "Y" branch from step 608), the controller determines whether there is a corresponding write command on the external queue (step 609). A write command might be on the external queue because (a) the host originally issued a full block write command, and the present write operation is responsive to that command; or (b) the host originally issued a short block write command which, for some reason (e.g., data was already in the read buffer), was never committed to cache band 301. In either case, the "Y" branch is taken from step 609, and a host acknowledgment is placed on the transmit queue (step 610). The corresponding write command is then removed from the external queue (step 611).

The controller then determines whether the write operation just completed was part of a short block write command, i.e., the last operation of the read/modify/write sequence (step 612). If so, short block write status table 613 is updated by removing the corresponding entry (step 613); otherwise, this step is skipped. The controller then returns and awaits completion of the next operation.

If the operation just completed was a read operation (the "Y" branch from step 614), the controller determines whether there are any short block writes outstanding for the full data block just read (step 615). If there is a short block write (the "Y" branch from step 615), the controller determines whether there is a corresponding short block write operation to cache band 301 on internal queue 225 (step 616). This may occur where multiple short block writes to the same full data block are received in close succession. If so, the short block write operation is removed from internal queue 225 (step 617). The controller then modifies the full data block just read with the data in the short block write (step 618). A write operation for the full data block thus modified is then placed on the internal queue (step 619. The controller updates the short block write status table 226 to reflect that the corresponding short block write has been read from disk and is now awaiting a full block write on the internal queue (step 620). There could be more than one such short block write outstanding for the full data block just read, in which case steps 616–618 and 620 are performed with respect to each, it being understood, however, that only one full block write is placed on the internal queue at step 619.

Having handled the short block writes, if any (steps 616–620), the controller then determines whether there is a read command on the external queue for the data block just read (step 621). If so, the response to the read command is placed on the transmit queue (step 622), and the read command is removed from the external queue (step 623). The controller then returns to await completion of the next internal operation.

If, at step 614, the "N" branch was taken, indicating that the operation just completed was neither a short block write nor a full block write nor a read, then the operation is handled as appropriate, indicated in FIG. 6 as block 624.

When short block data is written to cache band 301, the data is effectively in non-volatile storage, even though all the operations relating to the short block write have not yet completed. It is therefore safe to signal the host that the operation is completed, because from the host's perspective, the data is committed. As a result, the disk drive is free to perform the subsequent full block read and write operations at times convenient to the drive. It is possible that considerable time may elapse between the short block write to cache band 301 and the completion of the corresponding full block write to data area 303. If the drive loses power or otherwise loses state during this interval, it is possible to recover the data from the short block cache band. A recovery procedure is described in U.S. Pat. No. 6,378,037, herein incorporated be reference, is used, although other recovery procedures might alternatively be used.

It will be understood that certain disk drive operations unrelated to operation of the internal queue and the handling of short block write commands have not been described in detail above or shown in the figures. In fact, a disk drive typically performs multiple concurrently executing tasks, of which selection of an those described herein are only a portion. A typical disk drive responds to many different types of commands; responsive behavior may be very complex; exchange of information with the host may require many steps; etc. These details have been omitted from the description herein for clarity of illustration.

Additional Considerations

In general, the routines executed to implement the illustrated embodiments of the invention, whether implemented as part of an operating system or a specific application, program, object, module or sequence of instructions are referred to herein as "programs" or "control programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning digital devices such as disk drives, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD's, magnetic tape, and transmission-type media such as digital and analog communications links, including wireless communications links. Examples of signal-bearing media are illustrated in FIG. 1 as disk surface 102, in FIG. 2 as ROM 222.

Although a particular internal queue handling algorithm has been disclosed which uses certain factors including a threshold to switch operational modes from one band to another, other algorithms could conceivably be used for selecting operations from the internal queue for execution. Additionally, many variations in the order of step described herein are possible, and some steps may be considered optional or substitute steps may be possible within the scope of the present invention.

Although in the preferred embodiment small blocks are 512 bytes in length and long blocks are 4 Kbytes in length, it will be understood that different block sizes could be used.

In the preferred embodiment, the servo track formatting as described herein is employed in a rotating magnetic rigid disk drive device, in which disks are permanently installed in the drive. However, such a formatting could alternatively be used in a removable disk having a rigid or non-rigid substrate and data recorded in tracks on its surface.

In the preferred embodiment, the data recording tracks are concentric. However, as is known in the art, the tracks could also be spiral tracks.

Although a specific embodiment of the invention has been disclosed along with certain alternatives, it will be recognized by those skilled in the art that additional variations in form and detail may be made within the scope of the following claims:

What is claimed is:

1. A method of operating a disk drive data storage device, comprising:
   receiving a plurality of commands for accessing data in said data storage device, wherein at least some of said commands are short block write commands, each short block write command specifying a respective write of a block size N to a data area on said disk drive formatted for a block size M, where M>N;
   maintaining an internal queue of data access operations;
   with respect to at least some of said short block write commands, (a) generating a respective short block cache write operation for said internal queue, each said short block cache write operation specifying a write to a reserved cache area on a disk surface of said disk drive, said reserved cache area being formatted for storing blocks of size N, (b) notifying a host of completion of the short block write command after completion of the corresponding short block cache write operation, (c) generating a respective read operation for said internal queue, each said read operation reading a respective block of size M in which the data contained in the corresponding short block write command is to be stored, (d) modifying the respective block of size M after it is read with the data contained in the corresponding short block write command, and (e) generating a respective write operation for said internal queue, each said write operation writing the corresponding modified block of size M to its original location on a disk surface of said disk drive.

2. The method of operating a disk drive data storage device of claim 1, wherein said reserved cache area is a band at the outer diameter of at least one disk surface of said disk drive.

3. The method of operating a disk drive data storage device of claim 1, further comprising the step of: with respect to at least some of said short block write commands, (f) writing a plurality of said short block write operations on said internal queue sequentially to said reserved cache area.

4. The method of operating a disk drive data storage device of claim 3, wherein said step (f) comprises writing all pending short block write operations on said internal queue sequentially to said reserved cache area.

5. The method of operating a disk drive data storage device of claim 1, wherein at least some of said plurality of commands for accessing data received by said receiving step are full block write commands of block size M, said method further comprising the step of:
   with respect to said full block write commands of block size M, (a) generating a respective write operation of block size M for said internal queue, and (b) notifying a host of completion of the full block write command after completion of the corresponding write operation of block size M.

6. The method of operating a disk drive data storage device of claim 5, wherein at least some of said plurality of commands for accessing data received by said receiving step are full block write commands of block size N, said method further comprising the step of:
   with respect to said full block write commands of block size N, (a) generating a respective write operation of block size N for said internal queue, said write operation specifying a write to a data area on said disk surface formatted to a block size of N, and (b) notifying a host of completion of the full block write command after completion of the corresponding write operation of block size N.

7. The method of operating a disk drive data storage device of claim 1, wherein said step of managing an internal queue of data access operations comprises selecting operations from said internal queue for execution, wherein selecting operations from said internal queue for execution comprises choosing between a short block cache write operation and a data access operation which is not a short block cache write operation based upon a number of operations of at least one type on said internal queue.

8. The method of operating a disk drive data storage device of claim 7, wherein said step of selecting operations for and internal queue for execution chooses between a short block cache write operation and a data access operation which is not a short block cache write operation based upon whether a number of operations on said internal queue other than short block cache write operations exceeds a pre-determined threshold.

9. A control program product for a disk drive data storage device, comprising:

a plurality of processor-executable instructions recorded on signal-bearing media, wherein said instructions, when executed by a processor of said disk drive, cause the drive to perform the steps of:

receiving a plurality of commands for accessing data in said data storage device, wherein at least some of said commands are short block write commands, each short block write command specifying a respective write of a block size N to a data area on said disk drive formatted for a block size M, where M>N;

maintaining an internal queue of data access operations for execution;

with respect to at least some of said short block write commands, generating a respective short block cache write operation for said internal queue, each said short block cache write operation specifying a write to a reserved cache area on a disk surface of said disk drive said reserved cache area being formatted for storing blocks of size;

selecting operations from said internal queue for execution, wherein said selecting step chooses between a short block cache write operation and a data access operation which is not a short block cache write operation based upon a number of operations of at least one type on said internal queue.

10. The control program product for a disk drive data storage device of claim 9, wherein said selecting step chooses between a short block cache write operation and a data access operation which is not a short block cache write operation based upon whether a number of operations on said internal queue other than short block cache write operations exceeds a pre-determined threshold.

11. The control program product for a disk drive data storage device of claim 9, wherein if said selecting step selects a short block cache write operation for execution, then a plurality of said short block write operations on said internal queue are sequentially written to said reserved cache area.

12. The control program product for a disk drive data storage device of claim 11, wherein if said selecting step selects a short block cache write operation for execution, then all short block write operations on said internal queue are sequentially written to said reserved cache area.

13. A rotating magnetic disk drive data storage device, comprising:

a disk drive base;

a rotatably mounted disk and spindle assembly, said disk and spindle assembly comprising at least one rigid disk for recording magnetically encoded data on at least one surface of said at least one rigid disk, wherein a first portion of said at least one disk surface is formatted in blocks of a first size, and a second portion of said at least one disk surface is formatted in blocks of a second size smaller than said first size;

a movable actuator supporting at least one transducer head, said actuator positioning said at least one transducer head to access said magnetically encoded data on said at least one surface of said at least one rotatably mounted disk;

a controller for controlling the operation of said disk drive data storage device, said controller receiving write commands for writing data to said at least one disk surface, wherein at least some of said write commands are write commands for blocks of said first size and at least some of said write commands are write commands for blocks of said second size, wherein a third portion of said at least one disk surface is formatted in blocks of said second size as a write cache for temporarily storing blocks of said second size contained in short block write commands received by said disk drive data storage device, wherein said short block write commands specify writing said blocks of said second size to locations in said first portion of said at least one disk surface.

14. The method of operating a disk drive data storage device of claim 13, wherein said third portion of said at least one disk surface is a band at the outer diameter of at least one disk surface of said disk drive.

15. The rotating magnetic disk drive data storage device of claim 13, wherein the relative sizes of said first and second portions of said at least one disk surface are variable.

* * * * *